US009465565B2

(12) United States Patent
Sakabe

(10) Patent No.: US 9,465,565 B2
(45) Date of Patent: Oct. 11, 2016

(54) IMAGE FORMING APPARATUS AND IMAGE FORMATION METHOD SUITABLE FOR CHANGING BETWEEN THE NORMAL MODE AND SLEEP MODE

(71) Applicant: KYOCERA Document Solutions Inc., Osaka (JP)

(72) Inventor: Keiji Sakabe, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/788,240

(22) Filed: Jun. 30, 2015

(65) Prior Publication Data
US 2015/0378647 A1 Dec. 31, 2015

(30) Foreign Application Priority Data
Jun. 30, 2014 (JP) ................. 2014-134244

(51) Int. Cl.
G06F 3/12 (2006.01)
G06F 1/32 (2006.01)
G06K 15/00 (2006.01)
H04N 1/00 (2006.01)

(52) U.S. Cl.
CPC ........... G06F 3/1221 (2013.01); G06F 1/32 (2013.01); G06F 3/1229 (2013.01); G06F 3/1285 (2013.01); G06K 15/4055 (2013.01); H04N 1/00885 (2013.01); Y02B 60/1271 (2013.01)

(58) Field of Classification Search
CPC ............ G06F 3/1221; G06F 3/1224; G06K 15/4055; H04N 1/00896; Y02B 60/1271
USPC ............ 358/1.15, 1.14, 1.13, 1.16; 713/320, 713/323
See application file for complete search history.

(56) References Cited

U.S. PATENT DOCUMENTS

2010/0250987 A1* 9/2010 Furukawa ............ G06F 1/3203
713/323
2014/0313531 A1* 10/2014 Kojima ................ G06F 3/1221
358/1.13

FOREIGN PATENT DOCUMENTS

JP 2010-094925 A 4/2010

* cited by examiner

Primary Examiner — Jamares Q Washington
(74) Attorney, Agent, or Firm — Hawaii Patent Services; Nathaniel K. Fedde; Kenton N. Fedde

(57) ABSTRACT

Provided is an image forming apparatus that is coping with the response and the energy-saving effect. The image forming apparatus has a host system and a proxy response system. The host system transmits response data for information request data in a normal mode. The proxy response system transmits the response data for the information request data in a sleep mode. The memory part of the proxy response system memorizes information of the response data from the host system, and sleep mode transit time. The sleep control part makes the host system shift from the normal mode to the sleep mode based on the sleep mode transit time. The sleep control part changes the sleep mode transit time according to quantity of the information of the response data memorized in the memory part.

6 Claims, 12 Drawing Sheets

| IP ADDRESS | MAC ADDRESS (ETHERNET ADDRESS) |
|---|---|
| 192.168.0.123 | 00:C0:EE:AE:AB:C8 |

| No. | OID | DATA | |
|---|---|---|---|
| | | TYPE | DATA VALUE |
| 1 | 1.3.6.1.2.1.2.2.1.1.1 | INTEGER | 1 |
| 2 | 1.3.6.1.2.1.2.2.1.2.1 | STRING | eth0 |
| 3 | 1.3.6.1.2.1.2.2.1.3.1 | INTEGER | 6 |
| 4 | 1.3.6.1.2.1.2.2.1.4.1 | INTEGER | 1500 |
| 5 | 1.3.6.1.2.1.2.2.1.5.1 | Gauge32 | 0 |
| ⋮ | ⋮ | ⋮ | ⋮ |

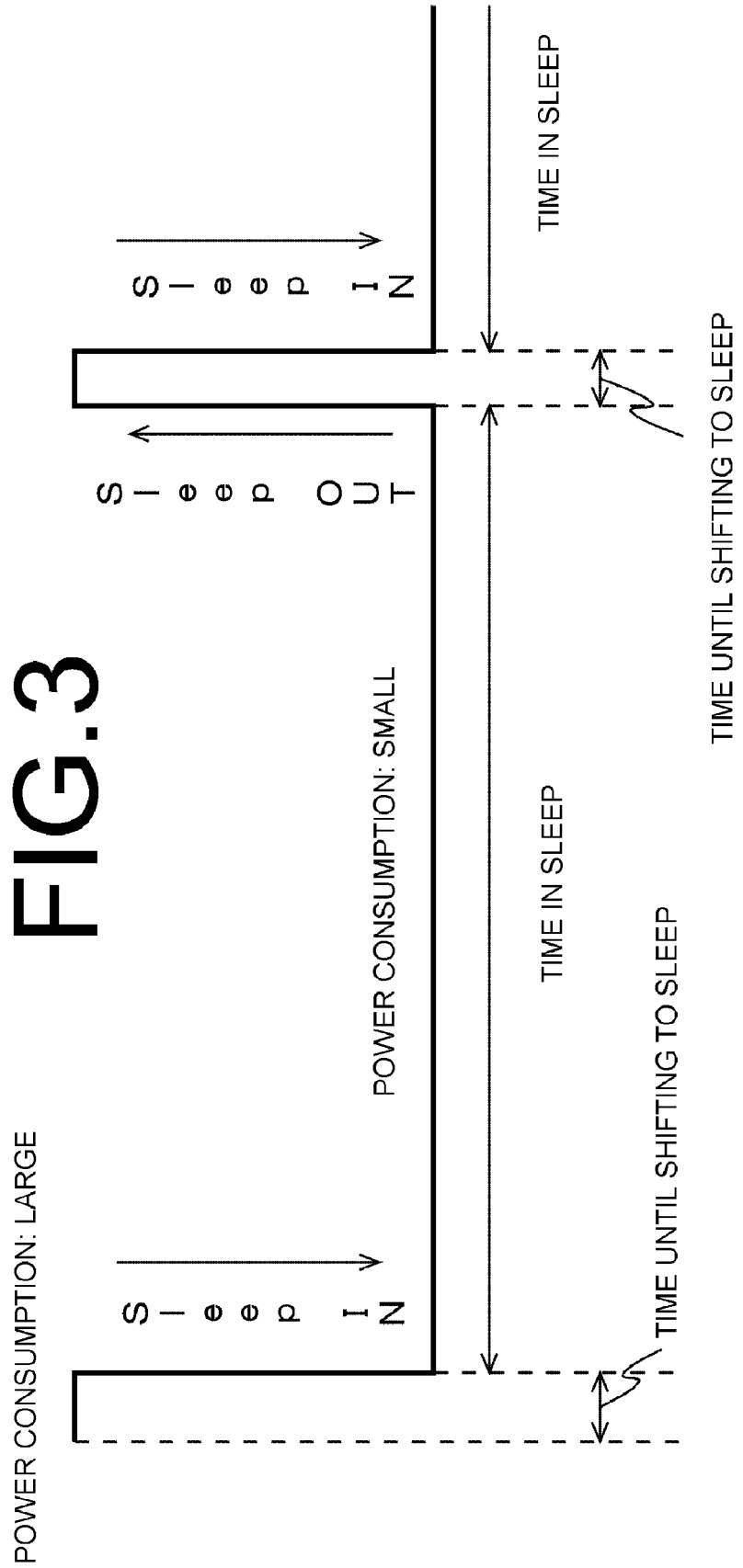

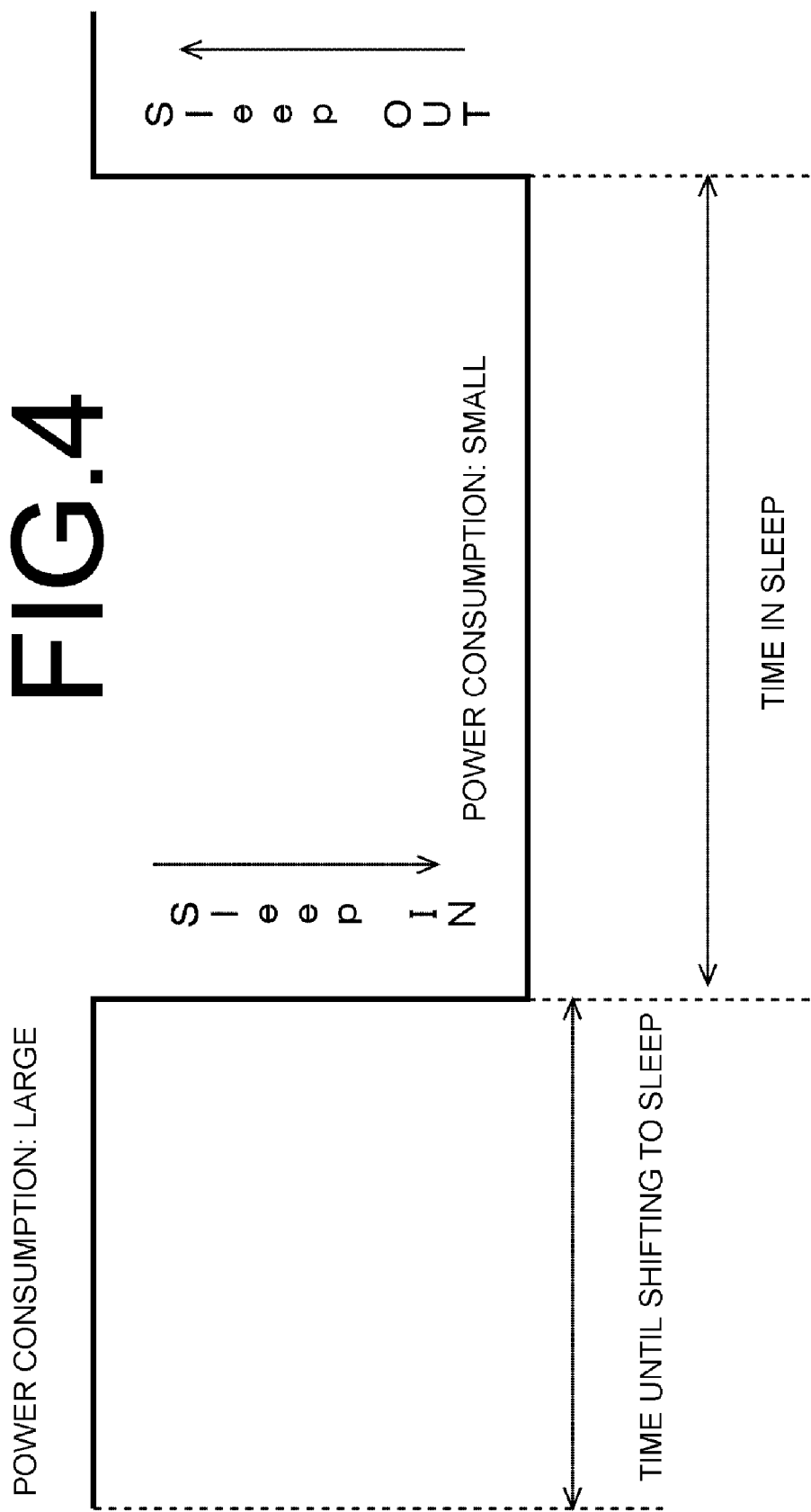

IMAGE FORMING APPARATUS AND IMAGE FORMATION METHOD SUITABLE FOR CHANGING BETWEEN THE NORMAL MODE AND SLEEP MODE

INCORPORATION BY REFERENCE

This application is based on and claims the benefit of priority from Japanese Patent Application No. 2014-134244 filed on Jun. 30, 2014, the contents of which are hereby incorporated by reference.

BACKGROUND

The present disclosure is related with an image forming apparatus and an image formation method suitable for changing between a normal mode and the sleep mode.

An image forming apparatus is MFP (Multifunction Peripheral), such as a printer, a multifunction printer, multifunctional peripheral equipment, or the like. As energy conservation measures, when set-up time passes in the state where a user does not use the image forming apparatus, the image forming apparatus shifts to a state of energy saving (henceforth a "sleep mode"). However, once it shifts to the sleep mode, it takes time until shifting to a state where an image forming apparatus can be used for the user (henceforth a "the normal mode").

That is, for example, a host computer transmits information request data for confirming information of an image forming apparatus to the image forming apparatus in the sleep mode via a network. In this case, the image forming apparatus shifts from the sleep mode to the normal mode and then transmits the response data, and thus it requires time. Therefore, when information request data is transmitted from the host computer, repeatedly, the number of times for shifting from the sleep mode to the normal mode increases. Since time to be in the sleep mode is short, the energy-saving effect reduces.

As this measure, a typical case enables also to transmit the response data in the sleep mode. For example, in the image processing apparatus of the typical case, a controller having two CPUs (Central Processing Unit,) that are main CPU for responding in the normal mode and sub CPU for responding in the sleep mode, is used.

At first, in the normal mode, main CPU memorizes response data in RAM (Random Access Memory) in main CPU. When shifting to the sleep mode, sub CPU extracts the frequently-used response data from RAM in main CPU and memorizes to RAM in sub CPU.

Thus, when shifting from the normal mode to the sleep mode, the frequently-used response data is memorized in RAM in sub CPU. Therefore, during the sleep mode, sub CPU can use the data memorized in RAM in sub CPU, make the response data, and transmit it.

SUMMARY

The image forming apparatus of the present disclosure has a host system and a proxy response system. The host system transmits a response data for information request data in a normal mode. The proxy response system transmits the response data for the information request data in a sleep mode. Also, the proxy response system includes a memory part and a sleep control part. The memory part memorizes information of the response data from the host system and sleep mode transit time for making host system shift from the normal mode to the sleep mode and for being set up specifically. The sleep control part makes the host system shift from the normal mode to the sleep mode based on the sleep mode transit time. Also, the sleep control part changes the sleep mode transit time according to quantity of the information of the response data memorized in the memory part. An image formation method of the present disclosure has a host system and a proxy response system. The host system transmits a response data to information request data in the normal mode. The proxy response system transmits the response data for the information request data in the sleep mode. In the present method, information of the response data from the host system and sleep mode transit time for making host system shift from the normal mode to the sleep mode and for being set up specifically is memorized. Also, the host system is made to shift from the normal mode to the sleep mode based on the sleep mode transit time. Also, the sleep mode transit time is changed according to quantity of the information of the response data memorized in the memory part.

BRIEF DESCRIPTION OF THE DRAWINGS

FIG. 2A is information included in the memory part of the proxy response system in FIG. 1 and is a table figure showing an example of address information area;

FIG. 2B is information included in the memory part of the proxy response system in FIG. 1 and is an example of an SNMP response information table;

FIG. 3 is a chart figure for illustrating the shifting control of the normal mode and the sleep mode by the sleep control part in FIG. 1;

FIG. 4 is a chart figure for illustrating the shifting control of the normal mode and the sleep mode by the sleep control part in FIG. 1;

DETAILED DESCRIPTION

Figure 1:
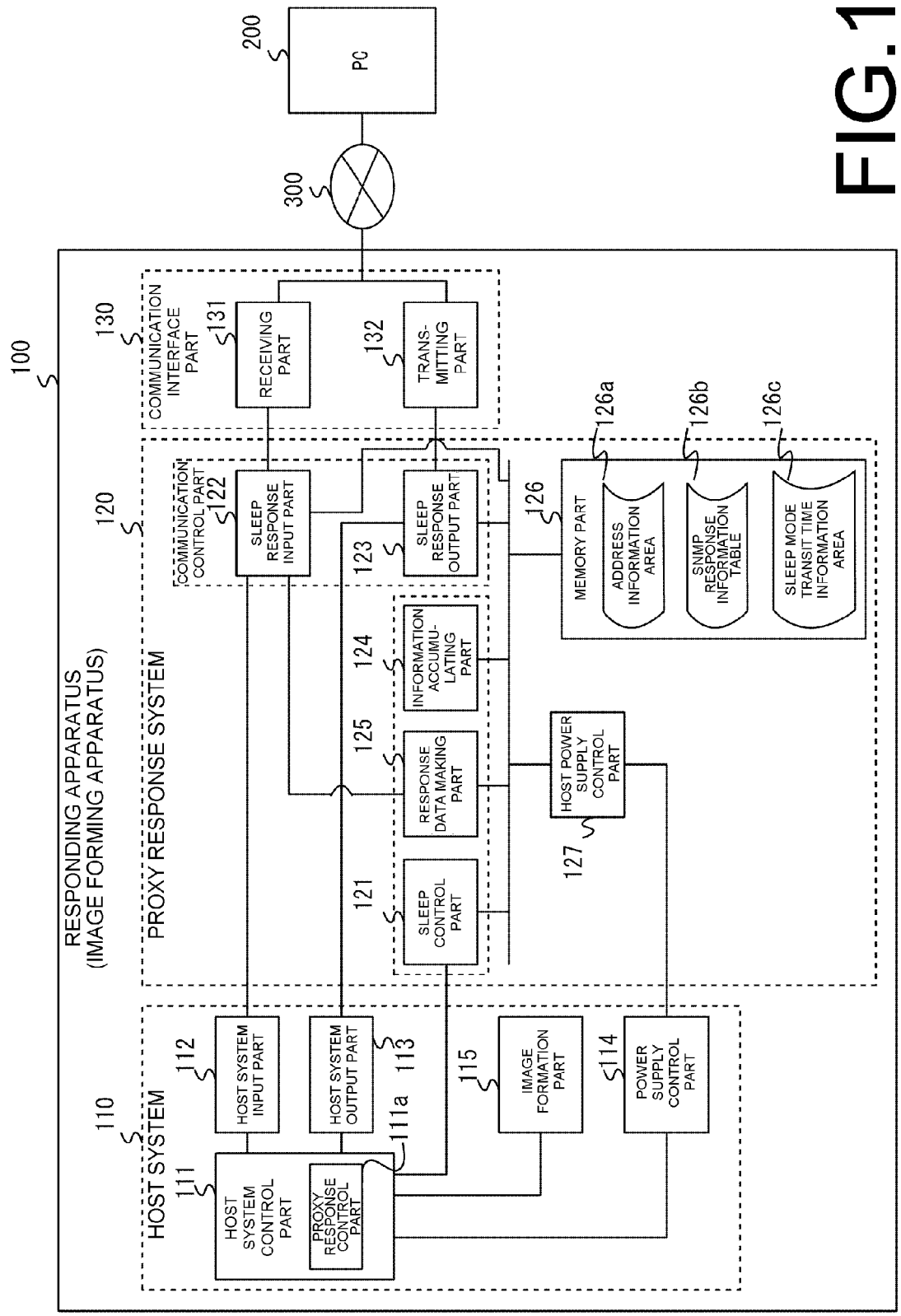
FIG. 1 is a line block diagram for illustrating one embodiment of the image forming apparatus of the present disclosure.

Hereinafter, an embodiment of the image forming apparatus of the present disclosure is described with reference to FIG. 1-FIG. 11. At first, as shown in FIG. 1, image forming apparatus 100 is connected to PC (Personal Computer) 200 via network 300. Image forming apparatus 100 is a printer, a multifunction printer, multifunctional peripheral equipment, an MFP, or the like.

Also, image forming apparatus 100 transmits the response data to information request data when the information request data from PC 200 is received via network 300. In addition, PC 200 is a host computer that transmits information request data to image forming apparatus 100 and receives the response data for the information request data.

Image forming apparatus 100 includes host system 110, proxy response system 120, and communication interface part 130. Host system 110 outputs the response data corresponding to the information request data from PC 200 when image forming apparatus 100 is the normal mode. In host system 110, when image forming apparatus 100 is in a sleep mode (a state of energy saving), an electric power supply is intercepted, and a function is stopped.

In addition, the shifting from the normal mode to the sleep mode is controlled based on sleep mode transit time (time until it shifts to the sleep mode). Sleep mode transit time is specifically set up, for example, by a user, an administrator, serviceman, or the like, and is specifically set up at the time of shipment. However, in the present embodiment, sleep mode transit time is changed by the after-mentioned sleep control part 121 according to amount of information of the response data for the information request data from PC 200 accumulated in the after-mentioned SNMP response information table 126*b*. The details are described later. Also, the shifting from the sleep mode to the normal mode is executed even when the proxy response by proxy response system 120 cannot be performed, for example. About this feature, the details are described later.

Host system 110 includes host system control part 111, host system input part 112, host system output part 113, power supply control part 114, and image formation part 115.

Host system control part 111 has a non-transitory recording medium and arithmetic controlling circuit. Also, host system control part 111 includes proxy response control part 111*a*. Proxy response control part 111*a* performs various control of proxy response system 120. Host system control part 111 requires sleep mode shifting from proxy response system 120, for example. This is for making image forming apparatus 100 shift to the sleep mode. The shifting to the sleep mode is performed based on the sleep mode transit time (time until it shifts to the sleep mode) set up specifically by the user, as mentioned above. However, the sleep mode transit time is changed by the after-mentioned sleep control part 121 according to the amount of information of the response data for the information request data from PC 200 accumulated in the after-mentioned SNMP response information table 126*b*.

Host system input part 112 inputs the information request data from PC 200 having output from proxy response system 120. Host system output part 113 outputs the response data for transmitting to PC 200 to proxy response system 120.

Power supply control part 114 supplies electric power to each part of host system 110. Also, power supply control part 114 supplies electric power to each part when the power supply is turned ON by control from proxy response system 120. Also, power supply control part 114 stops supplying the electric power to each part when the power supply is turned OFF by control from proxy response system 120. Image formation part 115 forms and outputs an image based on an instruction from PC 200, or the like.

Proxy response system 120 outputs the information request data from PC 200 having input from communication interface part 130 to host system 110 in the normal mode. Also, proxy response system 120 outputs the response data from host system 110 to communication interface part 130. Proxy response system 120 makes the response data corresponding to the information request data from PC 200 having input from communication interface part 130 in the sleep mode. Also, proxy response system 120 outputs the made response data to communication interface part 130.

Proxy response system 120 includes sleep control part 121, sleep response input part 122, sleep response output part 123, information accumulating part 124, response data making part 125, memory part 126, and host power supply control part 127. These are connected by bus.

Sleep control part 121 has a non-transitory recording medium. Sleep control part 121, response data making part 125, and information accumulating part 124 are functional blocks realized by executing a program by CPU. Also, a communication control part is configured of sleep response input part 122 and sleep response output part 123.

Also, sleep control part 121 changes the sleep mode transit time (time until it shifts to the sleep mode) according to the amount of information of the response data for the information request data from PC 200 accumulated in the after-mentioned SNMP response information table 126*b*. Also, sleep control part 121 notifies the shifting from the sleep mode to the normal mode for host system control part 111 incase that the response (making the response data) to the information request data from PC 200 cannot be performed.

Sleep response input part 122 inputs the information request data having output from communication interface part 130. Sleep response output part 123 outputs response data to communication interface part 130 and information accumulating part 124.

Information accumulating part 124 accumulates in memory part 126 for the information of the response data from host system 110 output to communication interface part 130 via sleep response output part 123. Information accumulating part 124 has a learning function. Therefore, information accumulating part 124 is not accumulated in memory part 126 about the information of the response data that overlaps with the information of the response data, which is already accumulated in memory part 126.

Memory part 126 is a non-transitory recording medium. Memory part 126 includes address information area 126*a*, SNMP response information table 126*b*, and sleep mode transit time information area 126*c*. The configuration of address information area 126*a*, SNMP response information table 126*b*, and sleep mode transit time information area 126*c* is described later. Information is not set to SNMP response information table 126*b* at the time of start of image forming apparatus 100. However, in normal mode, the response data by host system 110 is accumulated in SNMP response information table 126*b* by information accumulating part 124 in proxy response system 120 as information in each transmission to PC 200.

Host power supply control part 127 is controlled to make turn on or turn off power supply control part 114 in host system 110. For example, when image forming apparatus 100 shifts from the sleep mode to the normal mode, resumption of the electric power supply to host system 110 is instructed to power supply control part 114.

Communication interface part 130 is a communication interface for connecting with network 300. Communication interface part 130 includes receiving part 131 and transmitting part 132.

Receiving part 131 outputs the information request data to proxy response system 120 when the packet of the information request data transmitted from PC 200 is received.

Transmitting part 132 transmits the packet of the response data to PC 200 when the response data is input from proxy response system 120.

Then, with reference to FIG. 2A and FIG. 2B, a configuration of address information area 126a and SNMP response information table 126b, which are in memory part 126 of proxy response system 120, is explained. FIG. 2A shows an example of address information area 126a. FIG. 2B shows an example of SNMP response information table 126b.

At first, the configuration of address information area 126a is explained. Address information area 126a has items of "IP address" and "MAC Address (Ethernet (registered trademark) address)". In "IP address," the IP address of image forming apparatus 100 set in the response data is stored.

In "MAC Address," the MAC Address corresponding to the IP address of image forming apparatus 100 set in the response data is stored.

Then, the configuration of SNMP response information table 126b is explained. In SNMP response information table 126b, the information of the response data for the information request data specified in SNMP (Simple Network Management Protocol) is accumulated. SNMP response information table 126b has items of "No.", "OID (Object IDentifier)", and "data." "No." is a number attached to a group of "OID" and its corresponding "data" in ascending order.

At "OID", an identifier attached in order to distinguish an object of each management information stored in MIB (Management information base) specified in SNMP is stored. At "data", data for "OID" set in response data is stored. Also, at "data", there are items of "type" and "data value." At "type," the type of "data value" is stored. For example, "INTEGER" is stored when the type of "data" is an integer. At a "data value," an actual data value is stored.

Then, with reference to FIG. 3-FIG. 7, the shifting control between the normal mode and the sleep mode by sleep control part 121 as mentioned above is explained. At first, in the present embodiment, the normal mode and the sleep mode are efficiently shifted by sleep control part 121.

That is, for example, in image forming apparatus 100, when it focused on too much either of responsiveness (being able to respond immediately) or energy-saving effect (being power consumption small,) a merit and a demerit are happen, mutually. Therefore, it is important to control these with sufficient balance, appropriately. Incidentally, as the time of the normal mode is longer, the responsiveness improves. However, as the time of the normal mode is longer, the power consumption becomes larger. There are such a merit and a demerit.

Here, in order to become lower the power consumption in total, for example, as shown in FIG. 3, "shorter the normal state, which is large power consumption" or "longer the sleep mode (time in sleep,) which is small power consumption" is required. If an extreme speculation is mentioned, it is ideal to be shorten the time until it shifts to the sleep mode and to always become the sleep mode. However, in the sleep mode, it is impossible to perform all the processes as similar to the normal mode. That is, for a request of printing from PC 200, or the like, the response in the side of host system 110 is needed. Therefore, an idea brought as much as possible close to the ideal for "longer the sleep mode (time in sleep,) which is small power consumption" is needed.

In a typical case, for example, in the normal mode, the packet transmitted from the host system side is parsed, and information needed for the response in sleep is extracted and memorized in the proxy response system side. Also, a technology that proxy responses by using those information in sleep is proposed.

Also, a case that controls to raise the energy-saving effect by continuing the sleep mode and to raise the responsiveness by maintaining normal mode with sufficient balance, appropriately, is proposed. In this case, when sleep conditions are not fulfilled, shifting to the sleep state is prohibited.

Also, in addition to the above-mentioned sleep conditions, in accordance with using condition of a user, a case where some contents to proxy response are determined, dynamically, is proposed.

However, each of such technologies tends to incline toward either the responsiveness (it can respond immediately) or the energy-saving effect (power consumption is small) too much.

Accordingly, in the present embodiment, attention is directed to amount of information in the response data (amount of information accumulated in SNMP response information table 126b) for the information request data from PC 200 accumulated in memory part 126 of proxy response system 120. According to the present embodiment, the timing that shifts to the sleep mode is appropriately determined by sleep control part 121.

Figure 5:
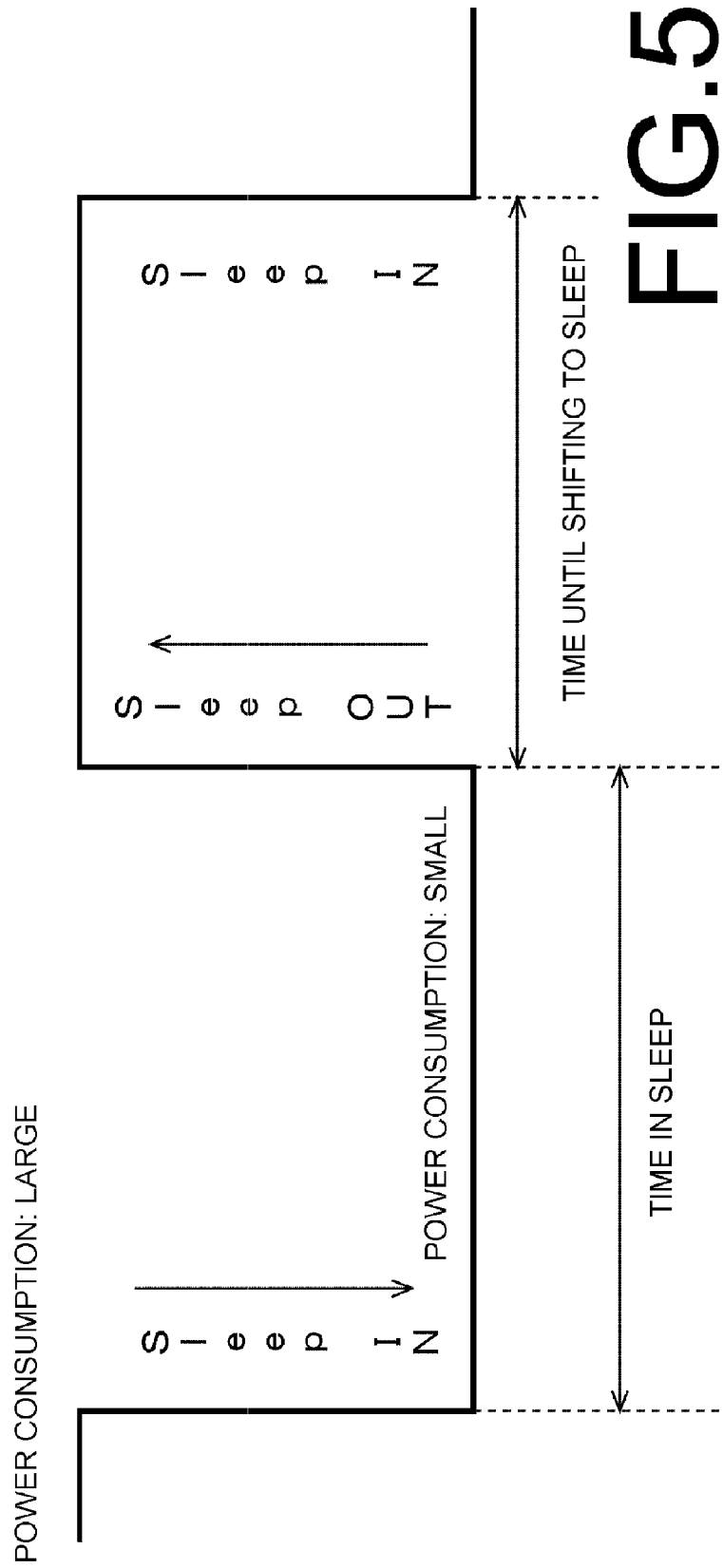
FIG. 5 is a chart figure for illustrating the shifting control of the normal mode and the sleep mode by the sleep control part in FIG. 1.

That is, as shown in examples in FIG. 4 and FIG. 5, the timing that shifts to the sleep mode in the first time and the timing that shifts to the sleep mode in the second time and after are dynamically adjusted according to the amount of information accumulated in SNMP response information table 126b. Thereby, the normal mode and the sleep mode are shifted, efficiently.

That is, in the normal mode, whenever the response data by host system 110 is transmitted to PC 200, information is accumulated in SNMP response information table 126b by information accumulating part 124 of proxy response system 120. Therefore, in normal mode, as the response data transmitted from host system 110 to PC 200 increases in number by passing time, the information accumulated in SNMP response information table 126b increases. However, as mentioned above, information accumulating part 124 does not perform accumulation in memory part 126 about the information of the response data that overlaps with the information of the response data, which has already accumulated in memory part 126.

In the case, when there is large amount of information accumulated in SNMP response information table 126b, it is preferred to shorten the sleep mode transit time (time until it shifts to the sleep mode) set up by the user, specifically. This is because it is considered that there is little number of times of being returned image forming apparatus 100 to normal mode. On the other hand, when there is little amount of information accumulated in SNMP response information table 126b, it is preferred to extend the sleep mode transit time. This is because image forming apparatus 100 is considered that the number of times of returning to normal mode increases.

Figure 6:
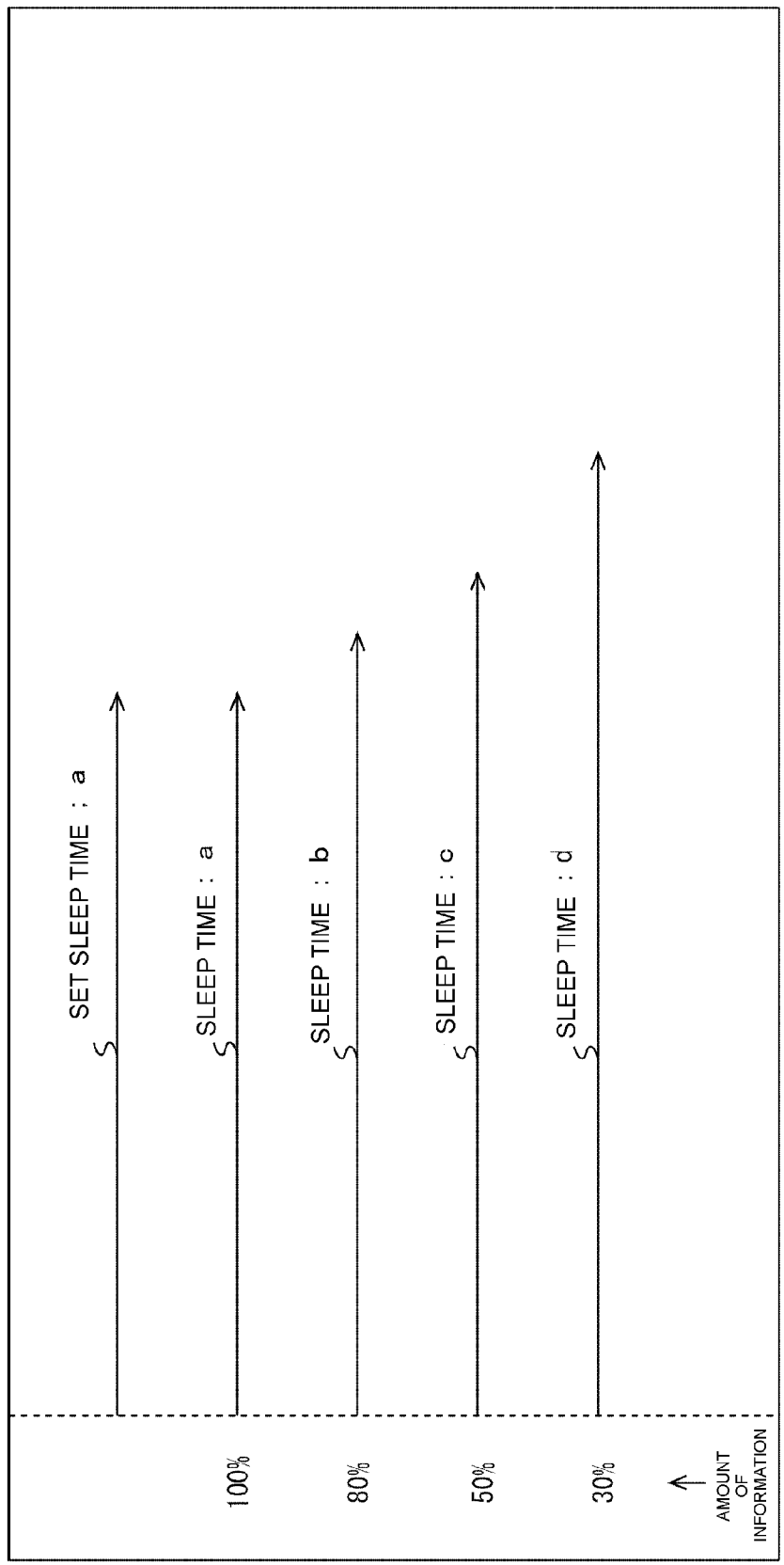
FIG. 6 is a chart figure for illustrating the shifting control of the normal mode and the sleep mode by the sleep control part in FIG. 1.

In detail, for example, as shown in FIG. 6, for example, in case that there is much amount of information accumulated in SNMP response information table 126b (for example, it is 100%), when it passes sleep mode transit time a (time until it shifts to the sleep mode) specifically set up by the user, it controls to shift from the normal mode to the sleep mode.

Also, when the amount of information accumulated in SNMP response information table 126b is less than 100%, such as 80%, 50%, or 30%, for example, the sleep mode transit time a is controlled to extend as like sleep mode transit time b-d. Here, the amount of information accumulated in SNMP response information table 126*b* is in 100% means as the amount of information that can be responded all the case for the information request data from PC 200.

Figure 7:
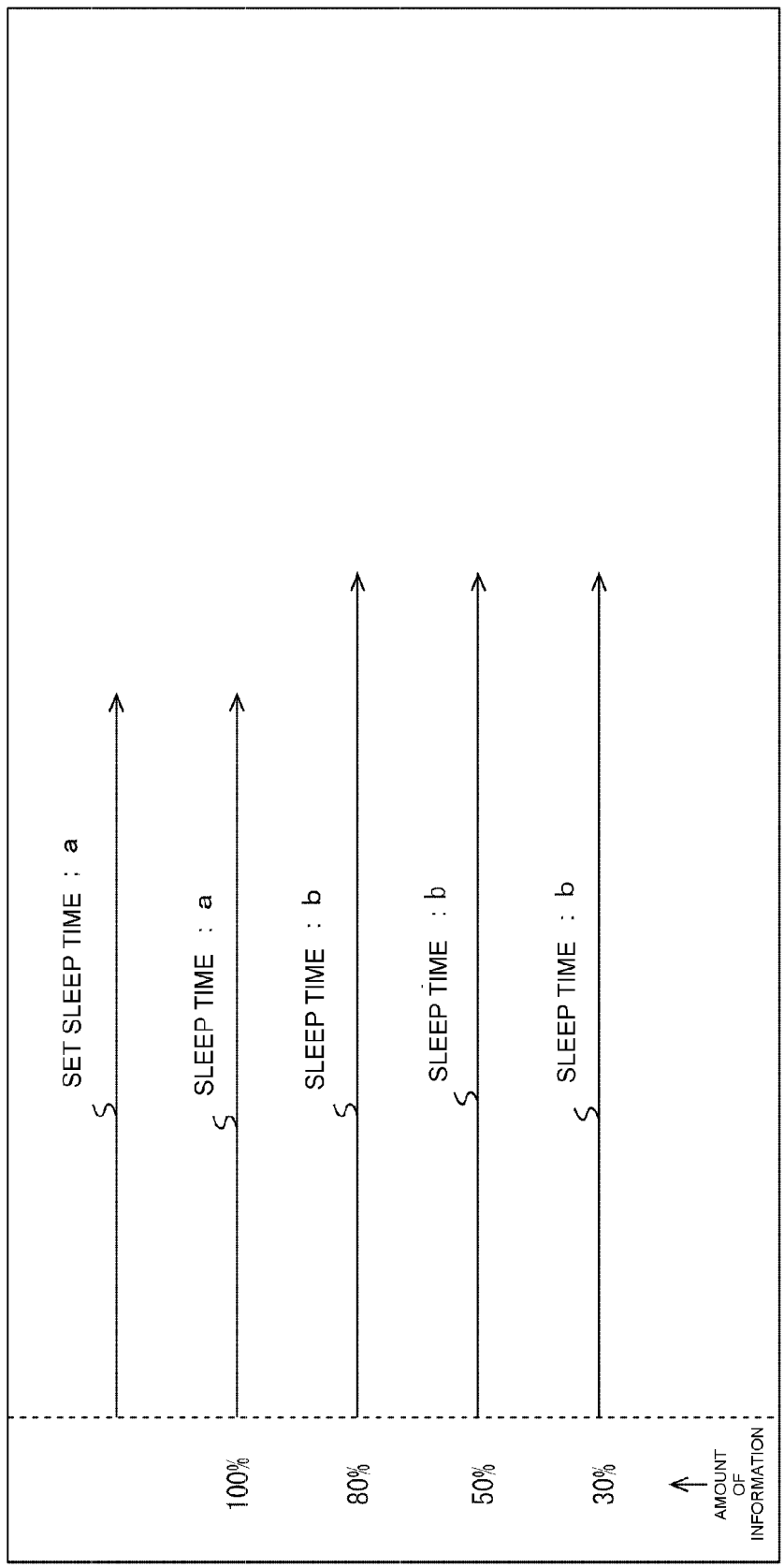
FIG. 7 is a chart figure for illustrating the shifting control of the normal mode and the sleep mode by the sleep control part in FIG. 1.

In addition, in FIG. 6, as corresponded to the ratio of the amount of information accumulated in SNMP response information table 126*b*, a case to extend in order as the sleep mode transit time b-d is shown. However, for example, as shown in FIG. 7, when less than 100%, it may be controlled to extend fixed time, such as the sleep mode transit time b.

In any case, when there is little amount of information accumulated in SNMP response information table 126*b*, it may control so that the sleep mode transit time a specifically set up by the user is extended. Thereby, responsiveness can be considered as important when there is little amount of information of SNMP response information table 126*b*, and energy-saving can be considered as important when there is much amount of information.

Then, with reference to FIG. 8-FIG. 11, a response process corresponding to the information request data from PC 200 is explained. In the following, four processes, "process flow in the normal mode", "flow of the shifting process from the normal mode to the sleep mode", "process flow in the sleep mode", and "flow of the shifting process from the sleep mode to the normal mode" are explained. Also, in the following explanation, the sleep mode transit time is specifically set up by the user. Also, the sleep mode transit time specifically set up is memorized in sleep mode transit time information area 126*c*, as mentioned above. Also, for example, the amount of information of SNMP response information table 126*b* is 100%.

(Process Flow in the Normal Mode)

Figure 8:
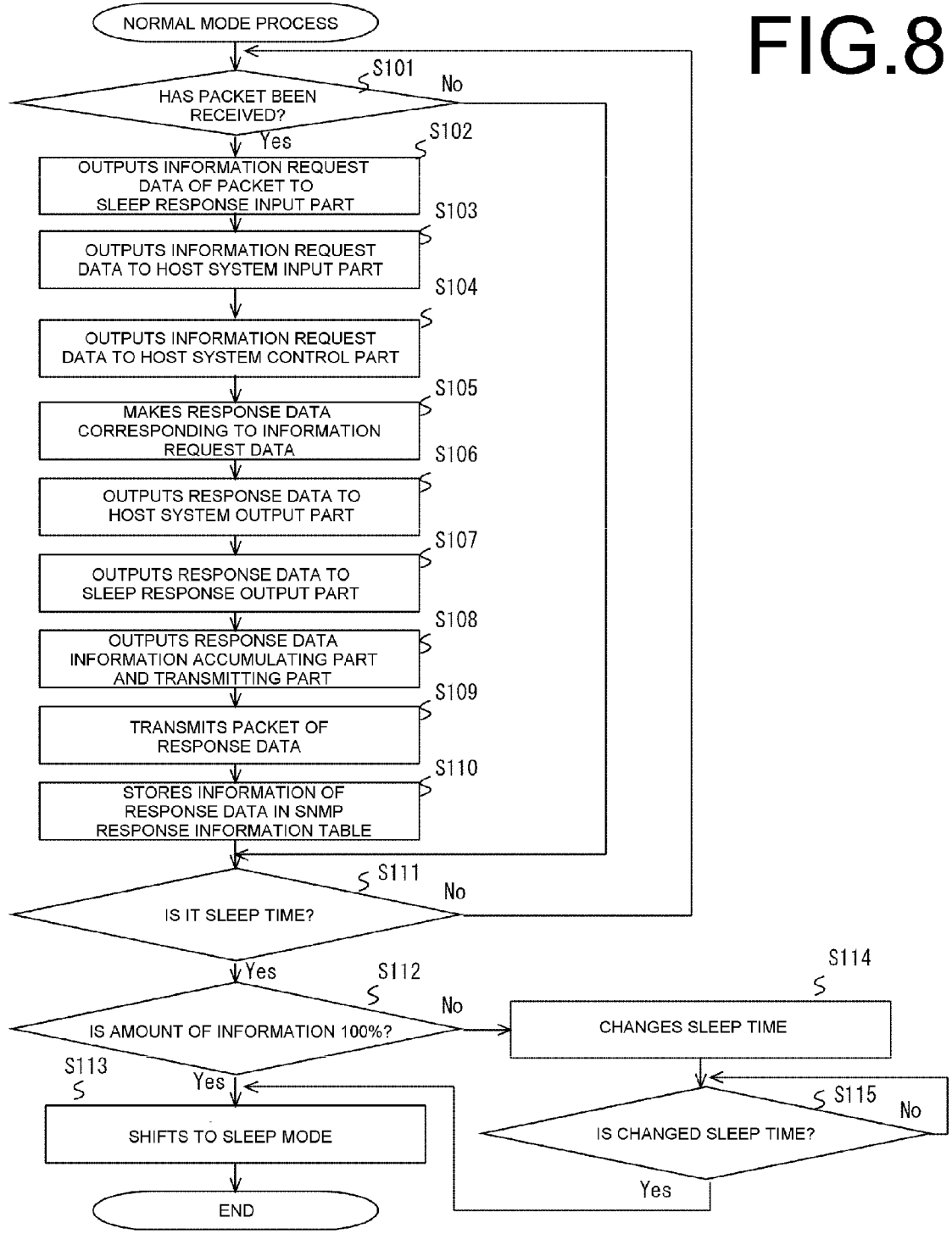
FIG. 8 is a flow chart for illustrating a process in the normal mode in the image forming apparatus in FIG. 1.

At first, the process flow in the normal mode is explained with reference to FIG. 8.

(Step S101)

Receiving part 131 determines whether or not a packet is received. If the packet is received (Yes in Step S101), it progresses to Step S102. If the packet is not received (No in Step S101), it progresses to Step S111.

(Step S102)

In case of Yes in Step S101, receiving part 131 outputs the information request data of the packet to sleep response input part 122.

(Step S103)

Then, when information request data is input, sleep response input part 122 outputs it to host system input part 112.

(Step S104)

Then, when information request data is input, host system input part 112 outputs it to host system control part 111.

(Step S105)

Then, when information request data is input, host system control part 111 makes response data for the information request data.

(Step S106)

Then, host system control part 111 outputs the response data, which is made, to host system output part 113.

(Step S107)

Then, when the response data is inputted, host system output part 113 outputs it to sleep response output part 123.

(Step S108)

Then, when response data is input, sleep response output part 123 outputs it to information accumulating part 124 and transmitting part 132.

(Step S109)

Then, transmitting part 132 inputs the response data and transmits the packet of the response data to a transmission destination via network 300. For example, when it is the packet of the response data for the information request data of the packet received from PC 200, the packet is transmitted to PC 200.

(Step S110)

Then, information accumulating part 124 inputs the response data. If it is response data of SNMP, information accumulating part 124 extracts "OID" and "data" from the response data and stores them in SNMP response information table 126*b*.

(Step S111)

Sleep control part 121 determines whether or not it passes the sleep mode transit time specifically set up by the user. If it pass the sleep mode transit time (Yes in Step S111), it progresses to Step S112. If it does not pass the sleep mode transit time (No in Step S111), it returns to Step S101.

(Step S112)

Sleep control part 121 confirms the amount of information of SNMP response information table 126*b* and determines whether or not the amount of information is 100%. If it is 100% (Yes in Step S112), it progresses to Step S113. If it is not 100% (No in Step S112), it progresses to Step S114.

(Step S113)

Sleep control part 121 notifies host system control part 111 that the amount of information of SNMP response information table 126*b* is 100%. Thereby, host system control part 111 and sleep control part 121 perform shifting process from the normal mode to the sleep mode.

(Step S114)

Sleep control part 121 notifies host system control part 111 that the amount of information of SNMP response information table 126*b* is not 100%. Accordingly, sleep mode transit time is changed. In this case, sleep control part 121 changes so that the sleep mode transit time memorized in sleep mode transit time information area 126*c* is to be extended. Sleep control part 121 notifies the changed time to host system control part 111.

(Step S115)

Sleep control part 121 determines until it passes the changed sleep mode transit time (No in Step S115). If it passes the changed sleep mode transit time (Yes in Step S115), it progresses to Step S113.

(Flow of the Shifting Process from the Normal Mode to the Sleep Mode)

Figure 9:
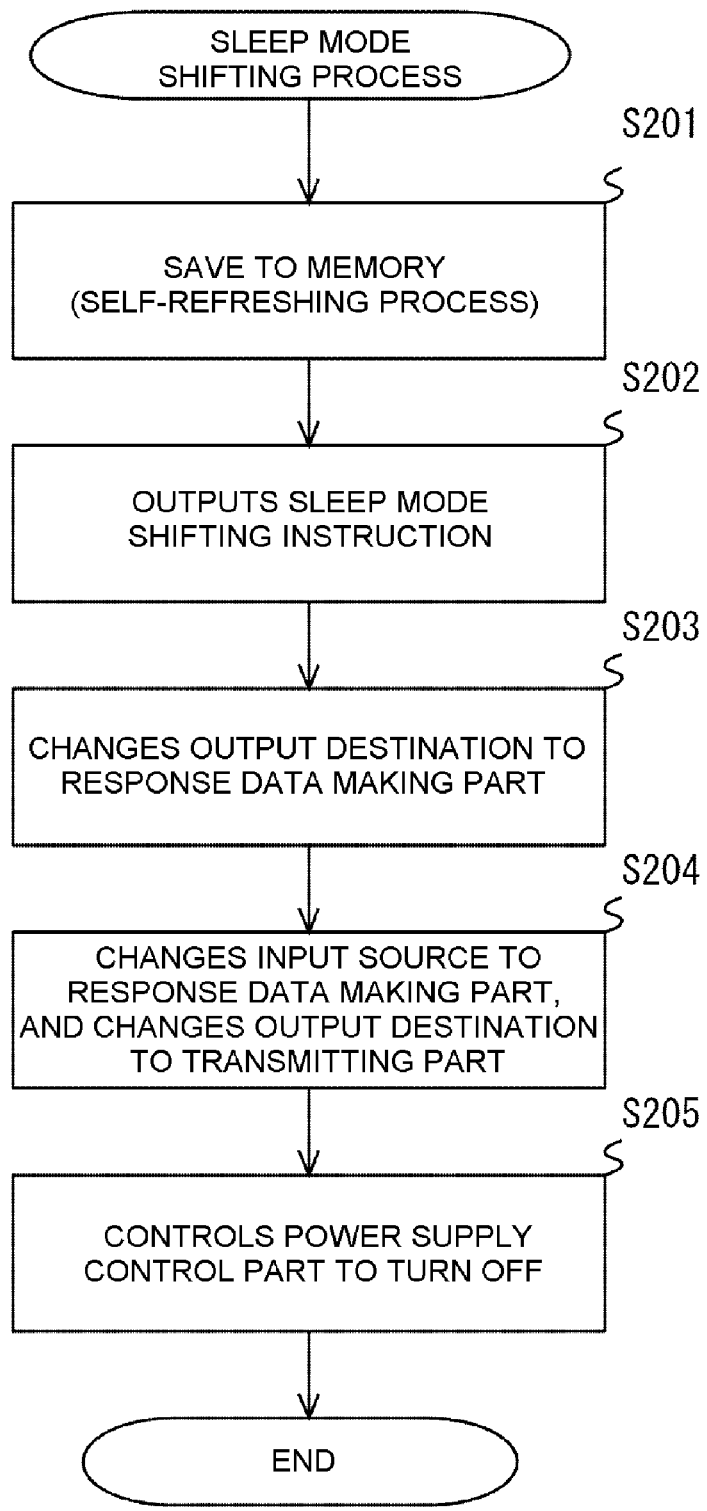
FIG. 9 is a flowchart for illustrating a shifting process from the normal mode to the sleep mode in the image forming apparatus in FIG. 1.

Then, with reference to FIG. 9, the flow of the shifting process from the normal mode to the sleep mode is explained.

(Step S201)

At first, host system control part 111 performs a process that saves data memorized in the memory of host system control part 111 to a disk (not shown), and a self-refreshing process is performed.

(Step S202)

Then, proxy response control part 111*a* outputs the instruction for shifting to the sleep mode to sleep control part 121.

(Step S203)

Then, sleep control part 121 changes the output destination of sleep response input part 122 from host system input part 112 to response data making part 125.

(Step S204)

Then, sleep control part 121 changes an input source of sleep response output part 123 from host system output part 113 to response data making part 125. Also, sleep control part 121 changes an output destination from both transmitting part 132 and information accumulating part 124 only to transmitting part 132.

(Step S205)

Then, sleep control part 121 controls power supply control part 114 to be turned OFF by host power supply control part 127 and ends sleep mode shifting process. As power supply control part 114 turns off, supply of power source is stopped, and it shifts to the sleep mode.

(Process Flow in the Sleep Mode)

Figure 10:
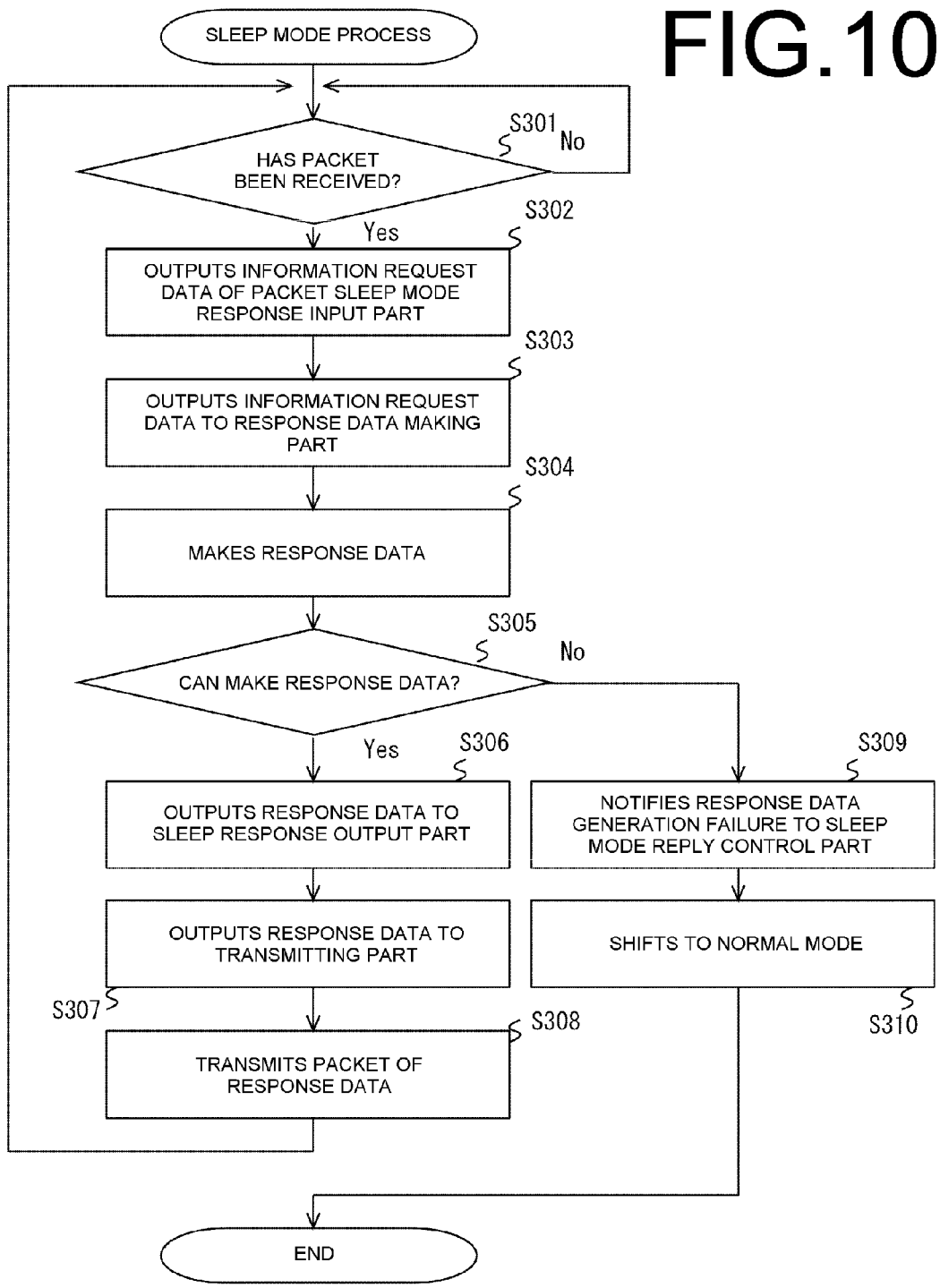
FIG. 10 is a flowchart for illustrating a process in the sleep mode in the image forming apparatus in FIG. 1.

Then, the process flow in the sleep mode is explained with reference to FIG. 10.

(Step S301)

Firstly, receiving part 131 determines whether or not the packet is received. If the packet is received (Yes in Step S301), it progresses to Step S302. If the packet is not received (No in Step S301), it returns to Step S301.

(Step S302)

At Yes in Step S301, receiving part 131 outputs the information request data of the packet to sleep response input part 122.

(Step S303)

Then, sleep response input part 122 outputs the input information request data to response data making part 125. In addition, in the sleep mode shifting process, the output destination of sleep response input part 122 has been changed to response data making part 125.

(Step S304)

Then, response data making part 125 extracts the information from address information area 126a or SNMP response information table 126b and makes the response data.

(Step S305)

Then, it is determined whether or not the response data has been made by response data making part 125. If the response data has been able to make (Yes in Step S305), it progresses to Step S306. If the response data has not been able to make (No in Step S305), it progresses to Step S309. In addition, as a case that has not been able to make the response data, for example, the information on address information area 126a or SNMP response information table 126b is lack. Also, as other cases, response data other than the response data specified by ARP (Address Resolution Protocol) or SNMP is made, or the like.

(Step S306)

At Yes in Step S305, response data making part 125 outputs the made response data to sleep response output part 123.

(Step S307)

Then, when response data is input, sleep response output part 123 outputs to transmitting part 132.

(Step S308)

Then, transmitting part 132 inputs the response data and transmits the packet of the response data to the transmission destination via network 300. For example, if it is the packet of the response data for the information request data of the packet received from PC 200, the packet is transmitted to PC 200.

(Step S309)

At No in Step S305, response data making part 125 outputs the notice that cannot make response data to sleep control part 121.

(Step S310)

Then, sleep control part 121 performs shifting process to the normal mode.

In addition, in the above-mentioned explanation, when the response data has not been able to make (No in Step S305), it shifts to the normal mode. However, it is not limited to this configuration. For example, in case that response data has not been able to make, it may be a configuration that discards the information request data received in image forming apparatus 100 and continues to be the sleep mode.

(Flow of the Shifting Process from the Sleep Mode to the Normal Mode)

Figure 11:
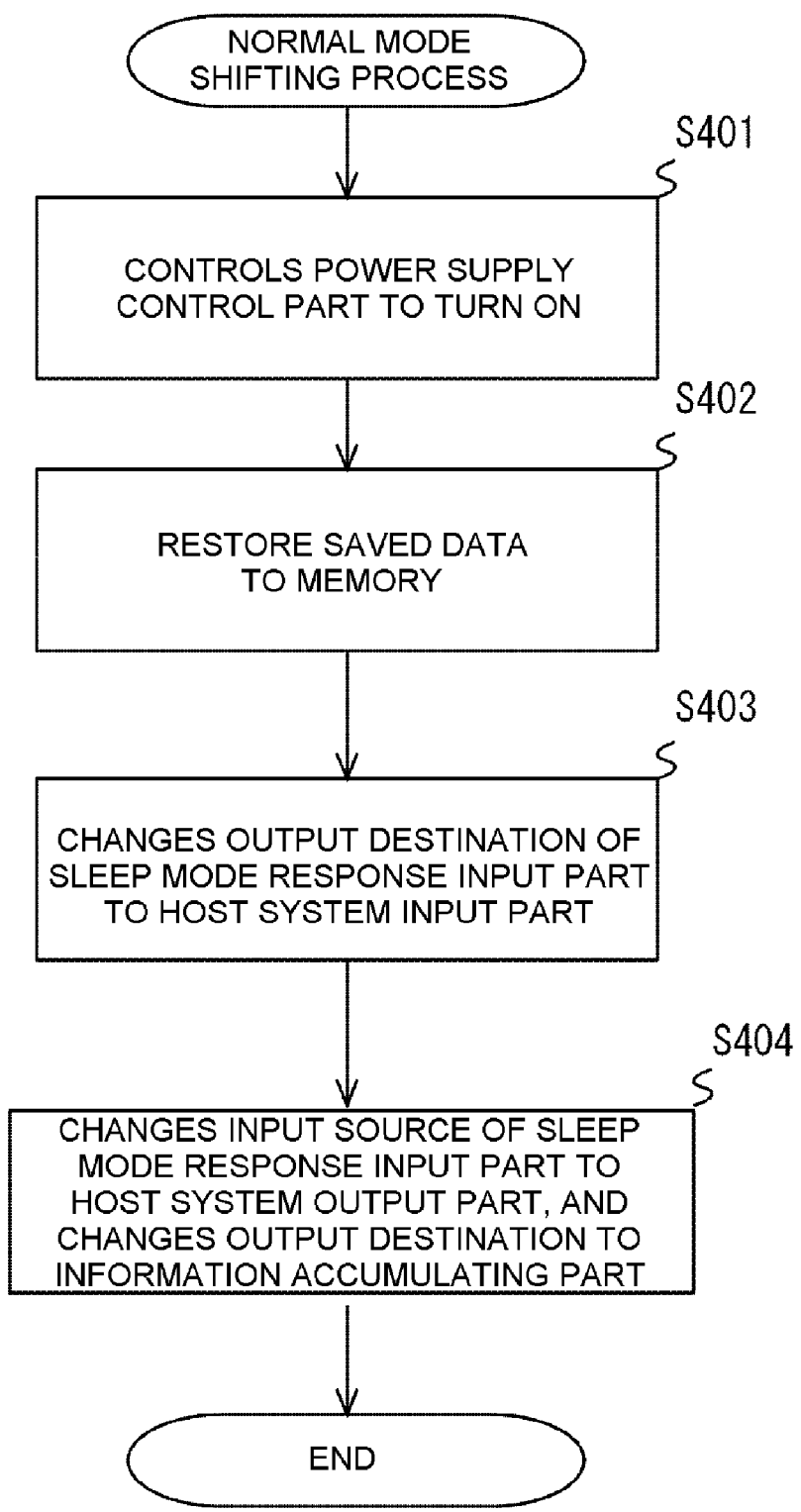
FIG. 11 is a flow chart for illustrating a shifting process from the sleep mode to the normal mode in the image forming apparatus in FIG. 1.

Then, with reference to FIG. 11, the flow of the shifting process from the sleep mode to the normal mode is explained.

(Step S401)

Firstly, sleep control part 121 controls power supply control part 114 to be turned ON by host power supply control part 127. Since power supply control part 114 is turned ON, the electrical power application to host system. 110 is started.

(Step S402)

Then, host system control part 111 restores the data saved in the disk to the memory.

(Step S403)

Then, sleep control part 121 changes the output destination of sleep response input part 122 from response data making part 125 to host system input part 112.

(Step S404)

Then, sleep control part 121 changes the input source of sleep response output part 123 from response data making part 125 to host system output part 113. Also, sleep control part 121 changes the output destination from only transmitting part 132 to both transmitting part 132 and information accumulating part 124 and ends the normal mode shifting process.

In this way, in the present embodiment, by sleep control part 121 that is a sleep control part of proxy response system 120, according to the quantity of the information of the response data from host system. 110 memorized in memory part 126 that is a memory part, the sleep mode transit time (time until it shifts to the sleep mode) specifically set up by the user is changed. Thereby, according to the quantity of the information of the response data memorized in memory part 126, the shifting of host system 110 from the normal mode to the sleep mode can be controlled, efficiently. Therefore, it can be coped with the responsiveness and the energy-saving effect.

That is, for example, if either of the responsiveness (being able to respond, immediately) and the energy-saving effect (being small power consumption) in image forming apparatus 100 inclines too much, a merit and a demerit is produced, mutually. Consequently, as mentioned above, according to the quantity of the information of the response data from host system 110 memorized in memory part 126, host system 110 is shifted from the normal mode to the sleep mode. Thereby, it can be appropriately controlled with sufficient balance to be cope with the responsiveness and the energy-saving effect.

In details, in the normal mode, whenever the response data is transmitted from host system 110, the amount of information of the response data accumulated in memory part 126 increases. Here, if there is little amount of information accumulated in SNMP response information table 126b, it is controlled so that sleep mode transit time a specifically set up by the user is extended. Thereby, it can be considered the responsiveness is important. On the other hand, if there is large amount of information, it controls by the sleep mode transit time a specifically set up by the user. Thereby, it can be considered the energy-saving is important.

Further explaining in detail, in a typical case of an image processing apparatus, in the normal mode, the response data is memorized previously in RAM of main CPU. Also, when the image processing apparatus shifts to the sleep mode, frequently-used response data is extracted by sub CPU from the response data memorized in RAM of main CPU. In this case, the extracted response data must be transmitted to RAM of sub CPU. Therefore, it needs time until shifting to the sleep mode.

Thus, when time is needed before shifting to the sleep mode, the time in the normal mode becomes long. Thereby, although the responsiveness by main CPU is maintained, the time in the sleep mode becomes short. Accordingly, the energy-saving effect is reduced.

Therefore, development of the image forming apparatus that can cope with the responsiveness and the energy-saving effect is desired.

The present disclosure is accomplished in view of such a situation, and provides an image forming apparatus that can cope with the responsiveness and the energy-saving effect.

According to the image forming apparatus of the present disclosure, according to the quantity of the information of the response data memorized in the memory part, the shifting from the normal mode to the sleep mode in a host system is controlled, efficiently. Therefore, it can be cope with the responsiveness and the energy-saving effect.

What is claimed is:

1. An image forming apparatus comprising:
a main Central Processing Unit (CPU) that transmits response data for information request data in a normal mode;
a sub CPU that transmits response data for the information request data in a sleep mode; wherein:
the sub CPU is configured for
memorizing sleep mode transit time in a sleep mode transit information area for making the main CPU shift from the normal mode to the sleep mode and for being set up specifically, and
making the main CPU shift from the normal mode to the sleep mode based on the sleep mode transit time;
the sub CPU includes a Simple Network Management Protocol (SNMP) response information table;
the sub CPU, in the normal mode, accumulates the information of the response data into the SNMP response information table; and
the sub CPU i) shortens the sleep mode transit time when there is a large amount of information accumulated in the SNMP response information table, and ii) extends the sleep mode transit time when there is little amount of information accumulated in the SNMP response information table.

2. The image forming apparatus according to claim 1, wherein the sub CPU, whenever a ratio of the amount of information accumulated in the SNMP response information table data is less than 100%, extends the sleep mode transit time for a fixed time.

3. The image forming apparatus according to claim 2, wherein
the fixed time is gradually lengthened correspondingly to a ratio of the amount of information accumulated in the SNMP response information table.

4. An image formation method performed by an image forming apparatus having a main Central Processing Unit (CPU) that transmits response data for information request data in a normal mode and a sub CPU that transmits response data for the information request data in a sleep mode, the method comprising:
memorizing sleep mode transit time in a sleep mode transit information area for making the main CPU shift from the normal mode to the sleep mode and for being set up specifically; and
making the main CPU shift from the normal mode to the sleep mode based on the sleep mode transit time, wherein:
the sub CPU includes a Simple Network Management Protocol (SNMP) response information table;
the sub CPU, in the normal mode, accumulates the information of the response data into the SNMP response information table; and
the sub CPU i) shortens the sleep mode transit time when there is large amount of information accumulated in the SNMP response information table, and ii) extends the sleep mode transit time when there is little amount of information accumulated in the SNMP response information table.

5. The image formation method according to claim 4, wherein the sub CPU, whenever a ratio of the amount of information accumulated in the SNMP response information table is less than 100%, extends the sleep mode transit time for a fixed time.

6. The image formation method according to claim 5, wherein the fixed time is gradually lengthened correspondingly to a ratio of the amount of information accumulated in the SNMP response information table.

* * * * *